(12) United States Patent
Tanishima et al.

(10) Patent No.: US 8,903,585 B2
(45) Date of Patent: Dec. 2, 2014

(54) CONTROL DEVICE AND CONTROL METHOD FOR HYBRID VEHICLE

(75) Inventors: Kaori Tanishima, Isehara (JP); Haruhisa Tsuchikawa, Yokohama (JP); Yutaka Takamura, Yokohama (JP); Takeshi Ohno, Yamato (JP); Tomoyuk Kodawara, Atsugi (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 0 days.

(21) Appl. No.: 13/878,583

(22) PCT Filed: Oct. 25, 2011

(86) PCT No.: PCT/JP2011/074542
§ 371 (c)(1),
(2), (4) Date: Apr. 10, 2013

(87) PCT Pub. No.: WO2012/057131
PCT Pub. Date: May 3, 2012

(65) Prior Publication Data
US 2013/0218389 A1   Aug. 22, 2013

(30) Foreign Application Priority Data
Oct. 26, 2010   (JP) ................................. 2010-239287

(51) Int. Cl.
*B60W 10/08* (2006.01)
*B60W 10/02* (2006.01)
(Continued)

(52) U.S. Cl.
CPC ................. *B60W 20/40* (2013.01); *B60K 6/48* (2013.01); *B60K 6/547* (2013.01); *B60W 10/02*
(Continued)

(58) Field of Classification Search
CPC ..... B60W 10/02; B60W 10/06; B60W 10/08; B60K 6/00; G06F 7/00
See application file for complete search history.

(56) References Cited

U.S. PATENT DOCUMENTS

2008/0017427 A1*   1/2008   Nakanowatari .............. 180/65.2

FOREIGN PATENT DOCUMENTS

JP   2007-126091 A   5/2007
JP   2007-331534 A   12/2007
(Continued)

*Primary Examiner* — John R Olszewski
*Assistant Examiner* — Jason Roberson
(74) *Attorney, Agent, or Firm* — Young Basile

(57) ABSTRACT

A control system for a hybrid vehicle includes a mode selection unit for start request of an engine; a slip determination unit for determining whether or not a second clutch is allowed to slip; and a start determination unit for determining whether or not to allow the engine to start. The start determination unit prevents the engine from starting when an input rotation speed or an output rotation speed of an automatic transmission is less than a predetermined value in the presence of the start request of the engine from the mode selection unit and the slip determination unit determines that the second clutch is not allowed to slip.

5 Claims, 12 Drawing Sheets

(51) Int. Cl.
- B60W 10/06 (2006.01)
- B60W 20/00 (2006.01)
- B60K 6/48 (2007.10)
- B60K 6/547 (2007.10)
- B60W 30/192 (2012.01)
- F02D 29/02 (2006.01)
- B60L 11/18 (2006.01)
- B60L 15/20 (2006.01)

(52) U.S. Cl.
CPC ...... (2013.01); *B60W 10/06* (2013.01); *B60W 10/08* (2013.01); *B60W 20/00* (2013.01); *B60W 30/192* (2013.01); *F02D 29/02* (2013.01); *B60L 11/1861* (2013.01); *B60L 15/20* (2013.01); *B60L 15/2054* (2013.01); *Y02T 10/6221* (2013.01); *Y02T 10/6286* (2013.01); *Y02T 10/48* (2013.01); *B60L 2210/40* (2013.01); *B60L 2220/14* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/445* (2013.01); *B60L 2240/507* (2013.01); *B60L 2270/145* (2013.01); *Y02T 10/7044* (2013.01); *Y02T 10/7005* (2013.01); *Y02T 10/705* (2013.01); *Y02T 10/7241* (2013.01); *Y02T 10/642* (2013.01); *B60W 2600/00* (2013.01); *Y10S 903/93* (2013.01); *B60L 2240/486* (2013.01)

USPC .................. 701/22; 180/65.265; 903/930

(56) References Cited

FOREIGN PATENT DOCUMENTS

| JP | 2007331534 A | * | 12/2007 |
| JP | 2008-44599 A | | 2/2008 |
| JP | 2010-202151 A | | 9/2010 |
| JP | 2010202151 A | * | 9/2010 |

\* cited by examiner

FIG. 4

| | B1 Fr/B | C1 I/C | C2 D/C | C3 H&LR /C | B2 LOW /B | B3 2346 /B | B4 R/B | F1 | F2 |
|---|---|---|---|---|---|---|---|---|---|
| 1st | (O) | | | (O) | O | | | O | O |
| 2nd | | | | (O) | O | O | | | O |
| 3rd | | | O | | O | O | | | |
| 4th | | | O | O | | O | | | |
| 5th | | O | O | O | | | | | |
| 6th | | O | | O | | O | | | |
| 7th | O | O | | O | | | | O | |
| Rev. | O | | | O | | | O | | |

CONTROL DEVICE AND CONTROL METHOD FOR HYBRID VEHICLE

TECHNICAL FIELD

The present invention relates to a control device and a control method for a hybrid vehicle having an internal combustion engine and a motor generator as a power source.

BACKGROUND

Upon starting of the engine at the time of the transition from an electrically driven (EV) mode to hybrid electric vehicle (HEV) mode, such a conventional technology Is known in which the transmission torque capacity of a second clutch will be lowered than a torque of motor/generator for starting the engine (see Japanese Laid-Open Patent Application Publication No. 2007-126091, for example).

However, when the vehicle speed is lower than a self-sustainable rotation speed of engine and the second clutch cannot be operated with slip, once the engine would be started, there is a problem of given a sense of discomfort to the driver.

BRIEF SUMMARY

The problem that the present invention solves is to provide a control device and control method for a hybrid vehicle that can alleviate the discomfort to the driver.

The present invention solves the above problem by preventing an internal combustion engine from being started when either the input rotation speed or output rotation speed of the transmission is lower than a predetermined value in response to a start request of the internal combustion engine and the friction engagement elements being impermissible to slip.

According to the present invention, in a situation in which vehicle speed is lower and the friction engagement element is not allowed to slip, starting of internal combustion engine may be cancelled so that the discomfort to the driver may be alleviated.

BRIEF DESCRIPTION OF THE DRAWINGS

The description herein makes reference to the accompanying drawings wherein like reference numerals refer to like parts throughout the several views, and wherein:

FIG. 4 is a diagram showing a shifting map of the automatic transmission of the hybrid vehicle shown in FIG. 3.

DETAILED DESCRIPTION

The embodiments according to the present invention are now described with reference to the drawings.

Figure 1:
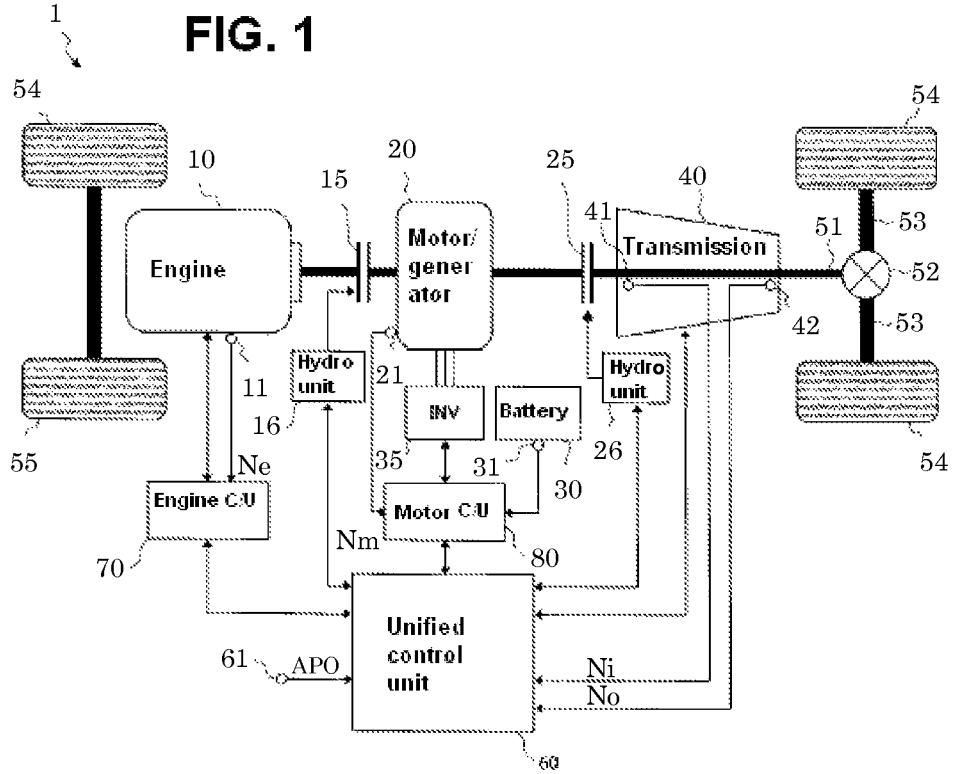
FIG. 1 is a block diagram showing an overall configuration of a hybrid vehicle in an embodiment according to the present invention.

The hybrid vehicle 1 of the embodiment according to the present invention is a vehicle of parallel system using a plurality of power sources. As shown in FIG. 1. the hybrid vehicle 1 is provided with an internal combustion engine 10 (hereinafter referred to as "engine"), first clutch 15, motor/generator 20 (motor, generator), second clutch 25, battery 30, inverter 35, automatic transmission 40, propeller shaft 51, differential gear unit 52, drive shaft 53, and left and right driving wheels 54.

The engine 10 is an internal combustion engine driven by gasoline, light oil, etc., and a valve openness of throttle valve, fuel injection amount, ignition timing, etc. is controlled based on a control signal from the engine control unit 70.

This engine 11 is provided with an engine rotation speed sensor 11 to detect engine rotation speed Ne.

The first clutch 15 is interposed between the output shaft of the engine 10 and the rotating shaft of the motor/generator 20, and is thus selectively connected and disconnected for torque transmission between engine 10 and motor/generator 20. As an example of first clutch 15, a multiple-plate wet clutch may be enumerated for continuously controlling the hydraulic flow rate and hydraulic pressure by way of a linear solenoid.

At the first clutch 15, hydraulic pressure of hydraulic unit 16 is controlled based on the control signal from unified control unit 60, and clutch plates will be engaged (including engagement under a slipped state) or released.

The motor/generator 20 is a synchronous type motor/generator in which permanent magnets are embedded in a rotor and stator coils are wound around the stator. This motor/generator 20 is provided with a motor rotation speed sensor 21. This motor/generator 20 functions not only as an electric motor but also as a generator. When supplied with a three phase alternate power from inverter 35, motor/generator 20 is driven to rotate (drive mode).

On the other hand, when rotor rotates by external force, motor/generator 20 produces the AC power by causing electromotive force at both ends of the stator coils (regeneration). The AC power generated by the motor generator 20 is charged to the battery 30 after being converted to direct current by the inverter 35.

Examples of battery 30 are lithium ion secondary battery or nickel-hydrogen secondary battery. A current-voltage sensor 31 is attached to the battery 30 and these detection outputs are output to the motor control unit 80.

The automatic transmission 40 has a multiple-step transmission with speed ratios such as seven forward and one reverse speed ratios, which is subject to switch or change automatically depending on vehicle speed, accelerator opening, etc. This automatic transmission 40 may change speed ratios in accordance with control signal from the unified control unit 60.

Figure 2:
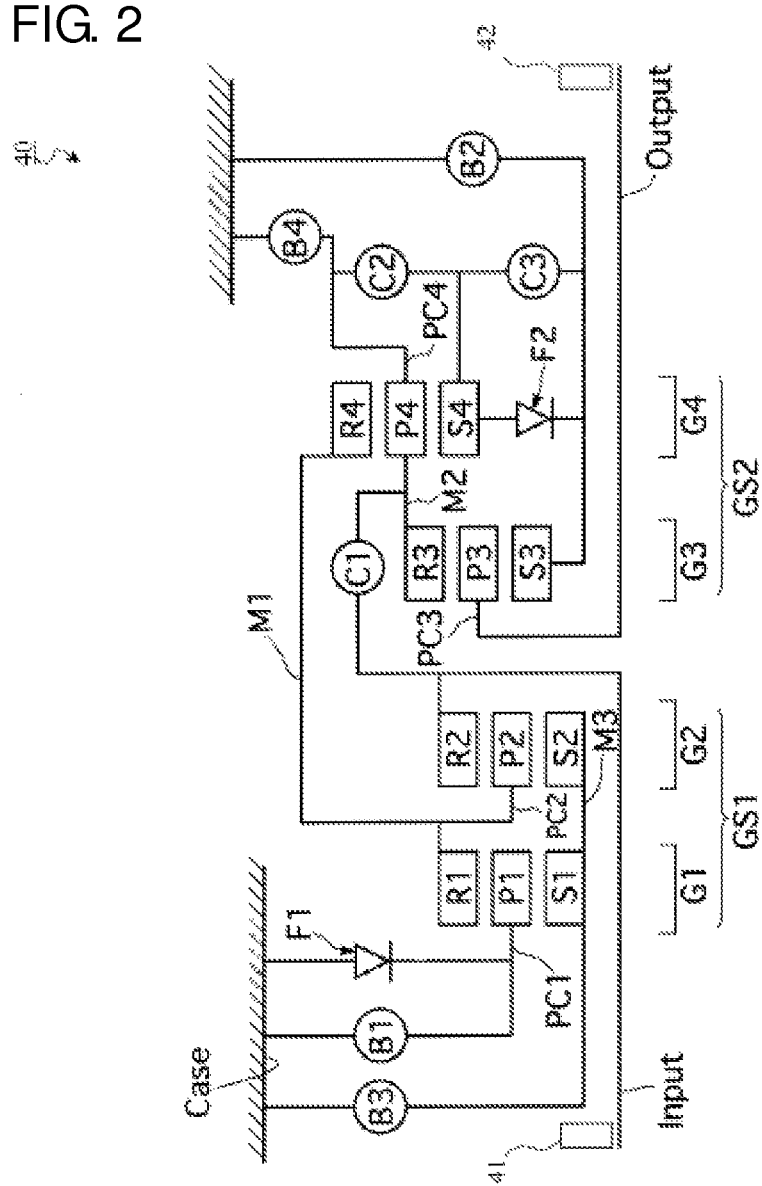
FIG. 2 is a skeleton diagram showing the configuration of the automatic transmission in an embodiment according to the present invention.

FIG. 2 is a skeleton diagram showing the configuration of the automatic transmission 40. The automatic transmission 40 is provided with a first planetary gear set GS1 (first planetary gear G1, second planetary gear G2) and a second planetary gear set GS2 (third planetary gear G3, a fourth planetary gear G4). Note that these first planetary gear set GS1 (first planetary gear G1, second planetary gear G2) and second planetary gear set GS2 (third planetary gear G3, a fourth planetary gear G4) are disposed in this order with respect to the side of input shaft, Input, toward the side of axial output shaft, Output.

In addition, the automatic transmission 40 is provided with a plurality of clutches C1, C2 and C3, a plurality of brakes B1, B2, B3 and B4, and a plurality of one-way clutches F1, F2.

The first planetary gear G1 is a single pinion type planetary gear having a first sun gear S1, first ring gear R1, and a first carrier PC1 supporting a first pinion P1 intermeshed with these gears S1, R1.

The second planetary gear G2 is a single pinion type planetary gear having a second sun gear S2, second ring gear R2, and a second carrier PC2 supporting second pinion P2 intermeshed with these gears S2, R2.

The third planetary gear G3 is a single pinion type planetary gear having a third sun gear S3, third ring gear R3, and a third carrier PC3 supporting third pinion P3 intermeshed with these gears S3, R3.

Further, the fourth planetary gear G4 is a single pinion type planetary gear having a fourth sun gear S4, fourth ring gear R4, and a fourth carrier PC4 supporting fourth pinion P4 intermeshed with these gears S4, R4.

The input shaft, Input, is connected to the second ring gear R2, and receives a rotational drive force from engine 10 or motor/generator 20. The output shaft, Output, is connected to the third carrier PC3 and transmits the rotational drive force output to drive wheels 54 through a final gear (not shown).

A first connecting member M1 is a member integrally connected to the first ring gear R1, second carrier PC2, and fourth ring gear R4. A second connecting member M2 is a member integrally connected to the third ring gear R3 and fourth carrier PC4. A third connecting member M3 is a member integrally connected to the first sun gear S1 and second sun gear S2.

The first planetary gear set GS1 is structured by connecting the first planetary gear G1 and second planetary gear G2 via the first connecting member M1 and third connecting member M3 to be composed of four rotation elements.

The second planetary gear set GS2 is structured by connecting the third planetary gear G3 and fourth planetary gear G4 via the second connecting member M2 to be composed of five rotation elements.

The first planetary gear set GS1 has a torque input path extending from input shaft, Input, to input to the second ring gear R2. The torque input to the first planetary gear set GS1 is output from the first connecting member M1 to the second planetary gear set GS2.

The second planetary gear set GS2 has a torque input path extending from input shaft Input to input to the second connecting member M2 as well as a torque path extending from the first connecting member M1 to fourth ring gear R4. The torque input to the second planetary gear set GS2 will be output from the third carrier PC3 to output shaft, Output.

Note that, when H&LR clutch C3 is released and rotation speed of fourth sun gear S4 is greater than that of first sun gear S1, third sun gear S3 and fourth sun gear S4 produce independent rotation speeds. Thus, such a configuration is obtained in which the third planetary gear G3 is connected with fourth planetary gear G4 via second connecting member M2, so that individual planetary gears attain gear ratios mutually independent.

Further, the input clutch C1 is a clutch selectively connecting and disconnecting the input shaft, Input, and the second connecting member M2. The direct clutch C2 selectively connects and disconnects the fourth sun gear S4 and fourth carrier PC4. H&LR clutch C3 selectively connects the third sun gear S3 and fourth sun gear S4. Note that a second one-way clutch is interposed between the third sun gear S3 and fourth sun gear S4.

Front brake B1 selectively stops rotation of first carrier PC1. In addition, first one-way clutch F1 is disposed parallel to front brake B1. Low brake B2 selectively stops third sun gear S3.

Brake B3 selectively stops rotation of the third connecting member M3 (first sun gear S1 and second sun gear S2). Reverse brake B4 selectively stops rotation of fourth carrier PC4.

The automatic transmission 40 is provided with an input rotation sensor 41 to detect rotation speed Ni of input shaft, Input (hereinafter, referred to as transmission input rotation speed) and an output rotation speed sensor 42 to detect rotation speed No (herein after referred to automatic transmission output rotation speed. Note that the transmission output rotation speed No corresponds to a vehicle speed V.

The second clutch 25 is interposed between motor/generator 20 and automatic transmission 40 for selectively connecting and disconnecting power transmission between motor/generator 20 and automatic transmission 40. As a concrete example of this second clutch 25, similarly in the first clutch 15, for example, a multiple-plate wet type clutch may be enumerated. The second clutch 25 is controlled in hydraulic pressure of hydraulic unit 26 in accordance with control signal from unified control unit 60 for controlling engagement (including a slipping state)/release.

Figure 3:
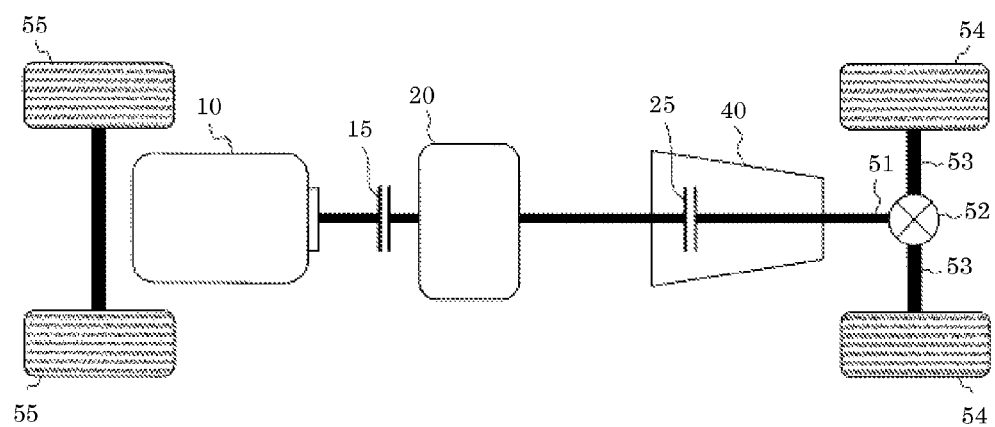
FIG. 3 is a diagram showing a power train of a hybrid vehicle of another embodiment according to the present invention.
Figure 5:
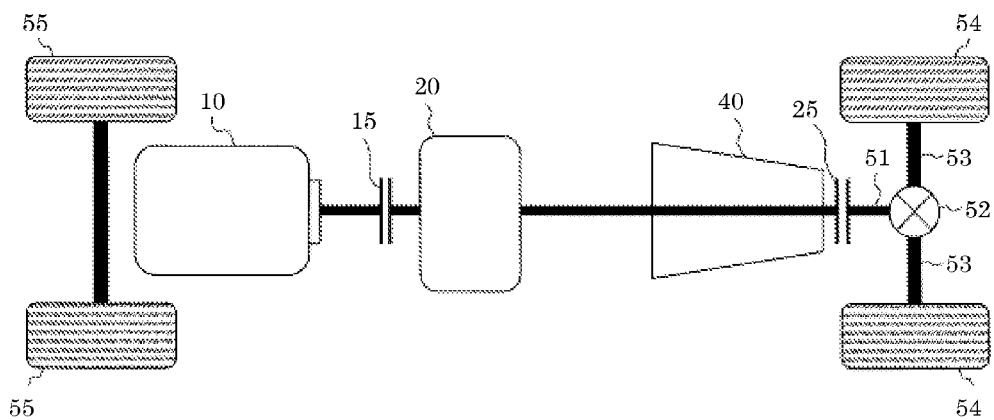
FIG. 5 is a diagram showing a power train of a hybrid vehicle of yet another embodiment according to the present invention.

As shown in FIG. 3, the second clutch 25 needs not be an added, dedicated clutch, but may be commonly used, with one or some elements are commonly used among the plurality of frictional engagement elements which are fastened at each speed ratio of the automatic transmission 40. As alternative, as illustrated in FIG. 5, the second clutch 25 may be separately provided between output shaft of automatic transmission 40 and propeller shaft 51.

For example, as shown in FIG. 3, when commonly using a friction engagement element within automatic transmission 40 as second clutch 25, the friction engagement element encircled by thick line in FIG. 4 may be used as second clutch 25. Specifically, for the first to third speed ratios, Low brake B2 is used as second clutch 25 while for fourth to seventh speed ratios, H&LR clutch C3 may be used as second clutch 25.

It should be noted that FIG. 4 is a diagram showing an engagement operation table for automatic transmission 40 with seven forward and one reverse speeds. The. "O" in FIG. 4 shows a state in which relevant clutch or brake is in an engaged state, while blank cell shows a state in which the brake or clutch is in a released state. In has concluded appropriate, blank indicates the state to which they are released. Further, in FIG. 4, the mark "(O)" indicates that the fastening operation takes place only during engine brake Note that in FIGS. 3 and 5, showing configurations of hybrid vehicle in the other embodiments, since the configurations other than the power train are the same as FIG. 1, only power trains are illustrated. Although in FIGS. 1, 3 and 5, an example of hybrid vehicle of rear wheel drive type is shown, it is of course possible to apply to a hybrid vehicle with FWD or 4WD.

The invention is not particularly limited to the above described step transmission with seven forward and one reverse speeds, but, for example the step transmission with five forward and one reverse speeds described in Japanese Patent Application Publication No. 2007-314097 may be used as the automatic transmission 40.

Returning to FIG. 1, the output shaft of automatic transmission 40 is connected to left and right drive wheels 54 via propeller shaft 51, differential gear unit 52, and left and right drive shafts 53. Note that left and right steered front wheels are indicted by reference sign 55 in FIG. 1.

In the hybrid vehicle 1 in the present embodiment, three drive modes are available to be switched there between depending on the engagement/release states of first, second clutches 15, 25.

The first drive mode is an electric motor drive mode (hereinafter called "EV mode"), which is achieved by releasing the first clutch 15 and engaging second clutch 25 such that vehicle is propelled by the motor/generator 20 as sole power source for driving the vehicle.

The second drive mode is an engine-employing drive mode or a hybrid drive mode (hereinafter called "HEV mode"), which is achieved by engaging both the first clutch 15 and second clutch 25 such that the vehicle travels by engine 10 in addition to motor/generator 20 as power source.

The third drive mode pertains to a slip drive mode (hereinafter called "WSC drive mode") which is achieved by maintaining second clutch 25 in a slipped state and vehicle is propelled by at least one of engine 1 and motor/generator 20 as power source. This WSC drive mode is in place to achieve a creep travel especially when the SOC (the amount of charge, State of Charge) is low, at a low temperature of cooling water of engine and the like.

Note that in a transitional state from EV mode to HEV mode, the first clutch that has been released is engaged and engine 10 will be started by making use of torque of motor/generator 20.

Moreover, the HEV mode further includes an "engine drive mode", a "motor assist drive mode", and a "power generating travel mode".

In the "engine drive mode", the engine 10 serves as the sole power source for propelling the drive wheels 54. In the "motor assist drive mode", both the engine 10 and the motor/generator 20 serve as power sources for propelling the drive wheels 54. In the "power generating travel mode", the engine 10 drives the drive wheels 54 while the motor/generator 20 functions as an electric generator Note that in addition to the modes described above, a power generation mode may be eventually available in a vehicle stopped state where motor/generator 20 is allowed to function as generator by making use of power of engine 10 to charge battery 30 or supplying power to electric equipment.

The control system of the hybrid vehicle 1 in the present embodiment is provided with a unified control unit 60, engine control unit 70 and motor control unit 80, as shown in FIG. 1. These control units 60, 70, and 80 are interconnected to each other through a CAN communication line, for example.

The engine control unit 70 is configured to receive engine rotation speed information from the engine speed sensor 11, and, in accordance with a target engine torque command tTe from the unified control unit 60, outputs a command controlling an engine operation point (engine rotation speed Ne, engine torque Te) to a throttle valve actuator, injector, spark plug and the like provided with engine 10. The information about engine rotation speed Ne, engine torque Te, is supplied to the unified control unit 60 through CAN communication line.

The motor control unit 80 is configured to receive information from the motor rotation sensor 21 equipped on motor/generator 20, and, in accordance with command such as a target mortar/generator torque tTm (or alternatively, target motor/generator rotation speed), outputs a command controlling the operation point of motor/generator 20 (motor rotation speed Nm, motor torque Tm) to inverter 35.

The motor control unit 80 is configured to calculate and manage the state of charge (SOC) of the battery 30 based on the current value and voltage detected by current/voltage sensor 31. This battery SOC information is used for control information of motor/generator 20, and sent to unified control unit 60 via CAN communication line.

The unified or integrated control unit 60 bears the function of driving or operating the hybrid vehicle 1 efficiently by controlling the operation point of the power train consisting engine 10, motor/generator 20, automatic transmission 40, first clutch 15, and second clutch 25.

The unified control unit 60 calculates the operation point of the power train based on the information from each sensor acquired through CAN communication, and executes to control the operation of the engine by the control command to the engine control unit 70, the operation of the motor/generator 20 by control command to motor control unit 80, operation of automatic transmission 40 through control command to automatic transmission 40, engagement/release operation of first clutch 15 by the control command to hydraulic unit 16 of first clutch 15, and engagement/release operation of second clutch 25 by the control command to hydraulic unit 26 of second clutch 25.

Figure 6:
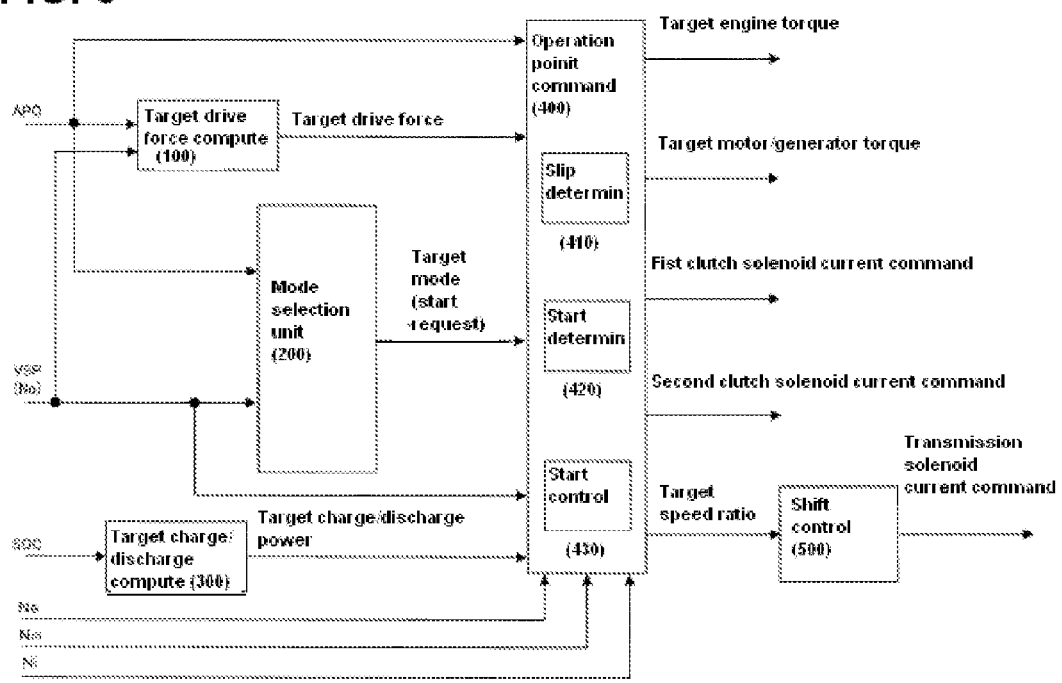
FIG. 6 is a control block diagram of a unified control unit in the embodiment according to the present invention.

Now, the control will be described which is executed by the unified control unit 60. FIG. 6 is a control block diagram of the unified control unit 60. The control described below is performed for every 10 msec, for example.

The unified control unit 60 includes, as shown in FIG. 2, a target drive force computing section 100, a mode selecting section 200, a target charge/discharge computing section 300, an operation point command section 400, and a shift control section 500.

Figure 7:
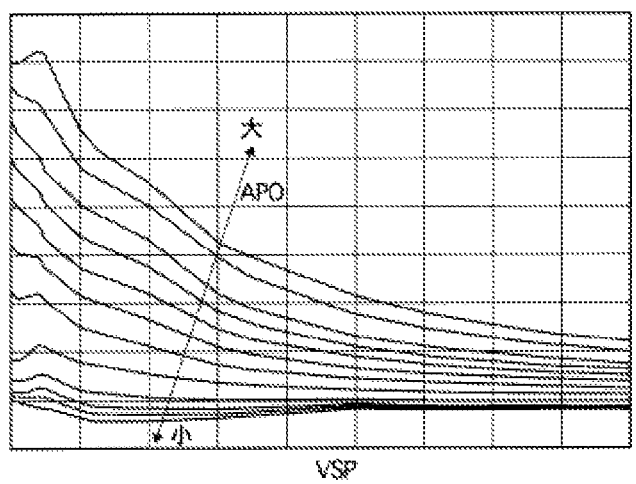
FIG. 7 is a diagram showing an example of target drive torque map in the embodiment according to the present invention.

The target driving force computing section 100 is configured to use the target driving force or torque map to compute a target driving force tFo0 based on the accelerator pedal opening APO detected by accelerator opening sensor 61 and the output rotation speed No of the transmission (i.e., vehicle speed VSP) detected by output rotation speed sensor of automatic transmission 40. An example of the target drive force map is shown in FIG. 7.

Figure 8:
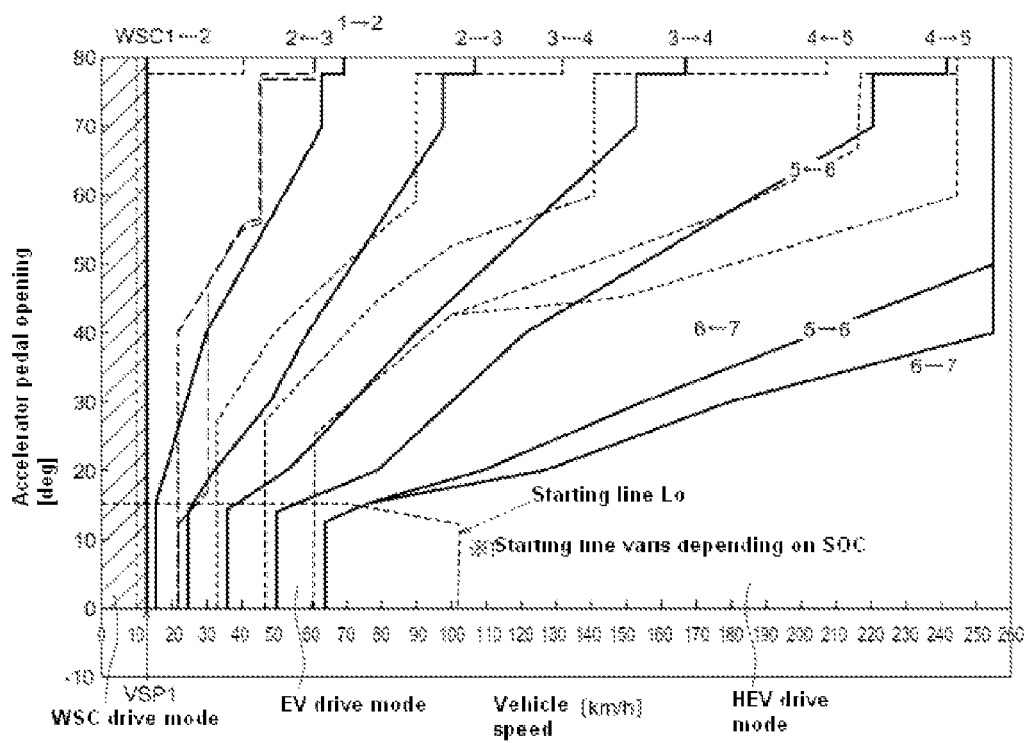
FIG. 8 is a diagram showing an example of mode map (shifting map) in the embodiment according to the present invention.

The mode selecting section is configured to refer to a preset mode map to select a target mode. An example of mode map is shown in FIG. 8. In the mode map of FIG. 8 (shift map), based on vehicle speed VSP and accelerator opening AP0, religions of EV drive mode, WSC drive mode, and HEV drive mode are respectively defined.

On this mode map, the EV drive mode is assigned to the inner side of the starting line Lo, and HEV drive mode is assigned to the outer side of the starting line Lo. Thus, the mode selection unit 200 requires the operation point command section 400 to start engine 10 when transitioning from EV drive mode to HEV drive mode by moving beyond the starting line L0.

In addition, the WSC drive mode described above is assigned respectively in both low-speed regions (the area below 15 km/h, for example) of EV drive mode and of HEV drive mode. Note that the predetermined vehicle speed VSP1 defining this WSC drive mode corresponds to a vehicle speed (i.e., vehicle speed corresponding to an idle speed of engine 10) at which engine 10 may rotate autonomously or at a self-sustainable rotation. Therefore, at the region in which the vehicle speed is lower than the predetermined vehicle speed VSP1, engine 1— may not rotate autonomously or on a self-sustainable basis.

However, even at EV drive mode being selected, if the SOC of battery 30 is equal to or below a prescribed value, control may transition to HEV mode depending on the situation.

Figure 9:
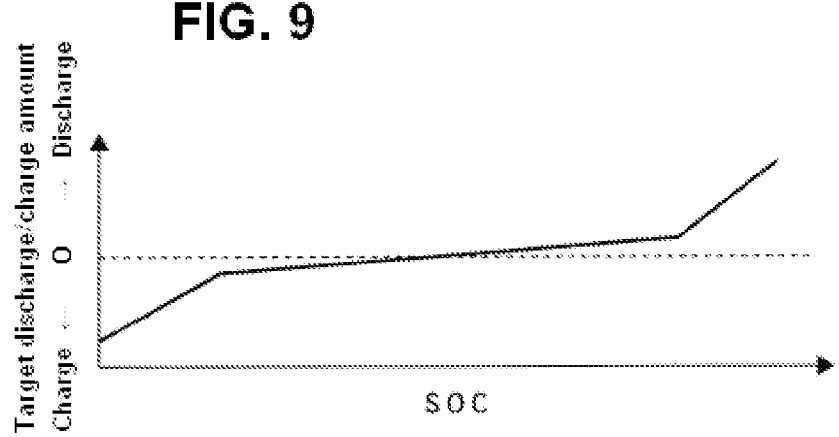
FIG. 9 is a diagram showing an example of a target charge/discharge amount map in the embodiment according to the present invention.

The target charge/discharge computing section 300 is configured to use the target charge/discharge map previously set such as one shown in FIG. 9 to compute a target charge/discharge power tP based on the battery SOC.

The operation point command section 400 is configured to compute a transitional target engine torque tTe, a transitional target motor/generator torque tTm (or target motor/generator rotation speed tNm), a transitional target first clutch transmission torque capacity tTc1, a transitional target second clutch transmission torque capacity tTc2, and a transitional target gear (gear ratio) of the automatic transmission 40, respectively based on the accelerator pedal opening APO, the target driving force tFo0, the target mode, the vehicle speed VSP, and the target charge/discharge power tP.

The target engine torque tTe is sent from unified control unit 60 to engine control unit 70, while the target motor/generator torque tTm (or target motor/generator rotation speed Nm) is sent from unified control unit 60 to motor control unit 80.

On the other hand, with respect to the target first clutch transmission torque capacity tTc1 and target second clutch transmission torque capacity tTc2, unified control unit 60 supplies solenoid currents to hydraulic units 16, 26, respectively corresponding to the target first clutch transmission torque capacity tTc1 and target second clutch transmission torque capacity tTc2.

The shift control section 500 is configured to control the solenoid valves inside the automatic transmission 40 such that the target gear step can be achieved. Note that a shift map such as shown in FIG. 8 assigns a target gear ratio based on the vehicle speed VSP and the accelerator pedal opening APO.

Further, in the present embodiment, as shown in FIG. 6, the operation point command section 400 is provided with a slip determination section 410, start determination section 420 and start control section 430.

The slip determination section 410 determines whether or not the second clutch may be allowed to slip based on the rotation speed difference (=Nm−Ni) across the second clutch 25 at the time at which the drive force of motor/generator 20 has been changed following an output of release command signal to the second clutch 25.

The start determination section 420 determines whether or not to allow engine 10 to start based on the determination results of slip determination section 410 and vehicle speed VSP.

The start determination section 420 allows engine 10 to start when the second clutch 25 is allowed to slip, or vehicle speed VSP (=output rotation speed of automatic transmission 40 Ne) exceeds a predetermined vehicle speed VSP1 (VSP≥VSP1) despite the second clutch 25 being inadmissible to slip).

On the other hand, when the second clutch is not allowed to slip and vehicle speed VSP is below the predetermined vehicle speed VSP1 (VSP<VSP1), start determination section 420 does not allow to start engine 10. Note that start determination section 420 may allow to start engine 10 based on comparison between the input rotation speed Ni of automatic transmission 40 and a predetermined rotation speed. The predetermined rotation speed in this case shall correspond to that at which engine may rotate autonomously or on self-sustainable basis, i.e., an idling rotation speed of the engine 10.

The start control section 430 executes control to start engine 10 based on the determination results of the start determination unit 420.

This start control unit 430 is capable of performing two types of start control, i.e., a normal start control to start engine 10 with maintaining second clutch 25 being in a slipped state, and a back-up start control to start engine 10 with the second clutch 25 completely engaged.

The start control section 430 performs a normal start control (see FIG. 11) when the second clutch 25 can slip, while performs a back-up start control (see FIG. 12) when the second clutch may not allowed to slip and vehicle speed VSP exceeds the predetermined vehicle speed VSP1 (VSP≥VSP1).

Figure 10:
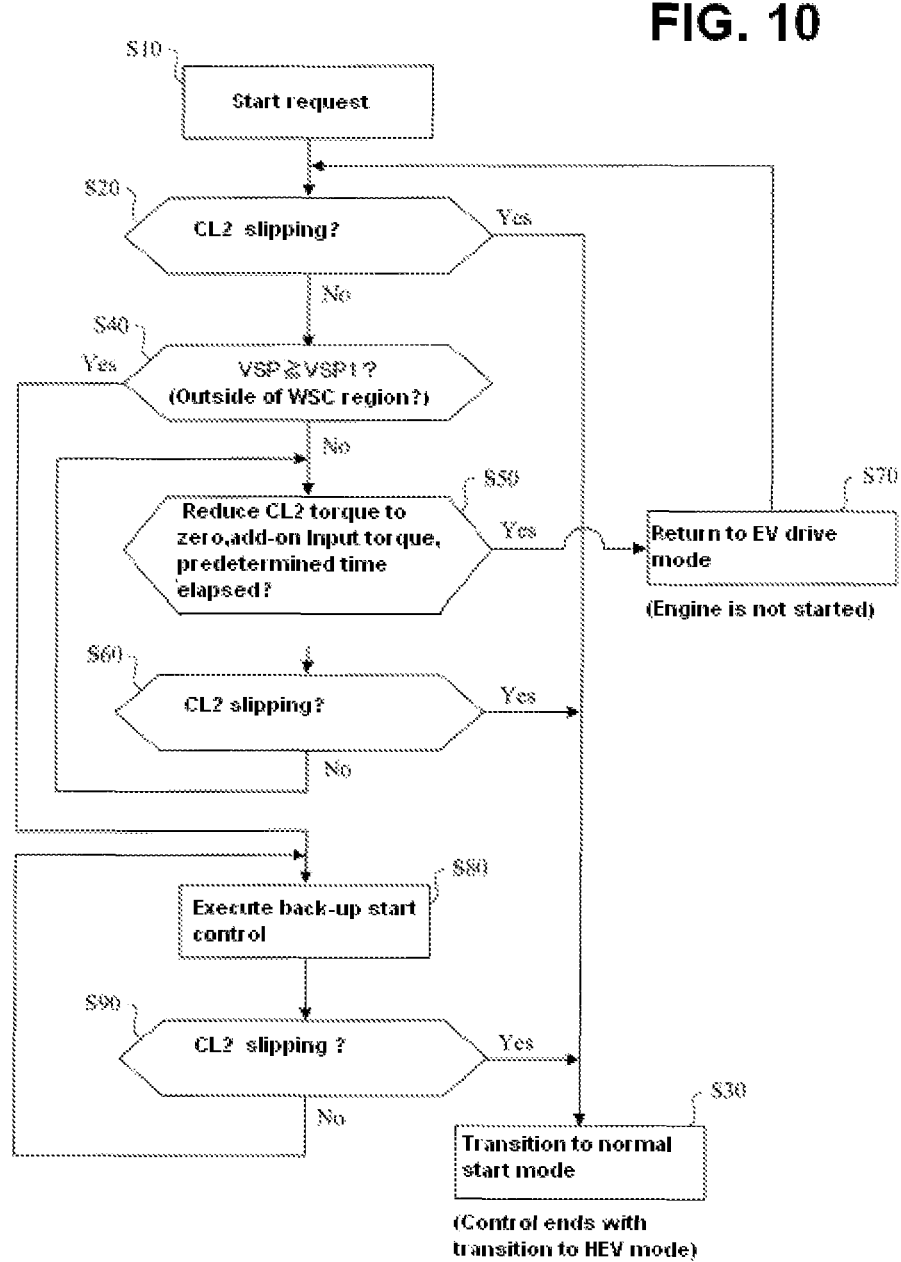
FIG. 10 is a flowchart showing an engine start control in the embodiment according to the present invention.

The engine start control of the hybrid vehicle 1 in the present embodiment is now described with reference to FIGS. 10 to 12. FIG. 10 is a flowchart showing an engine start control in the embodiment according to the present invention.

Figure 11:
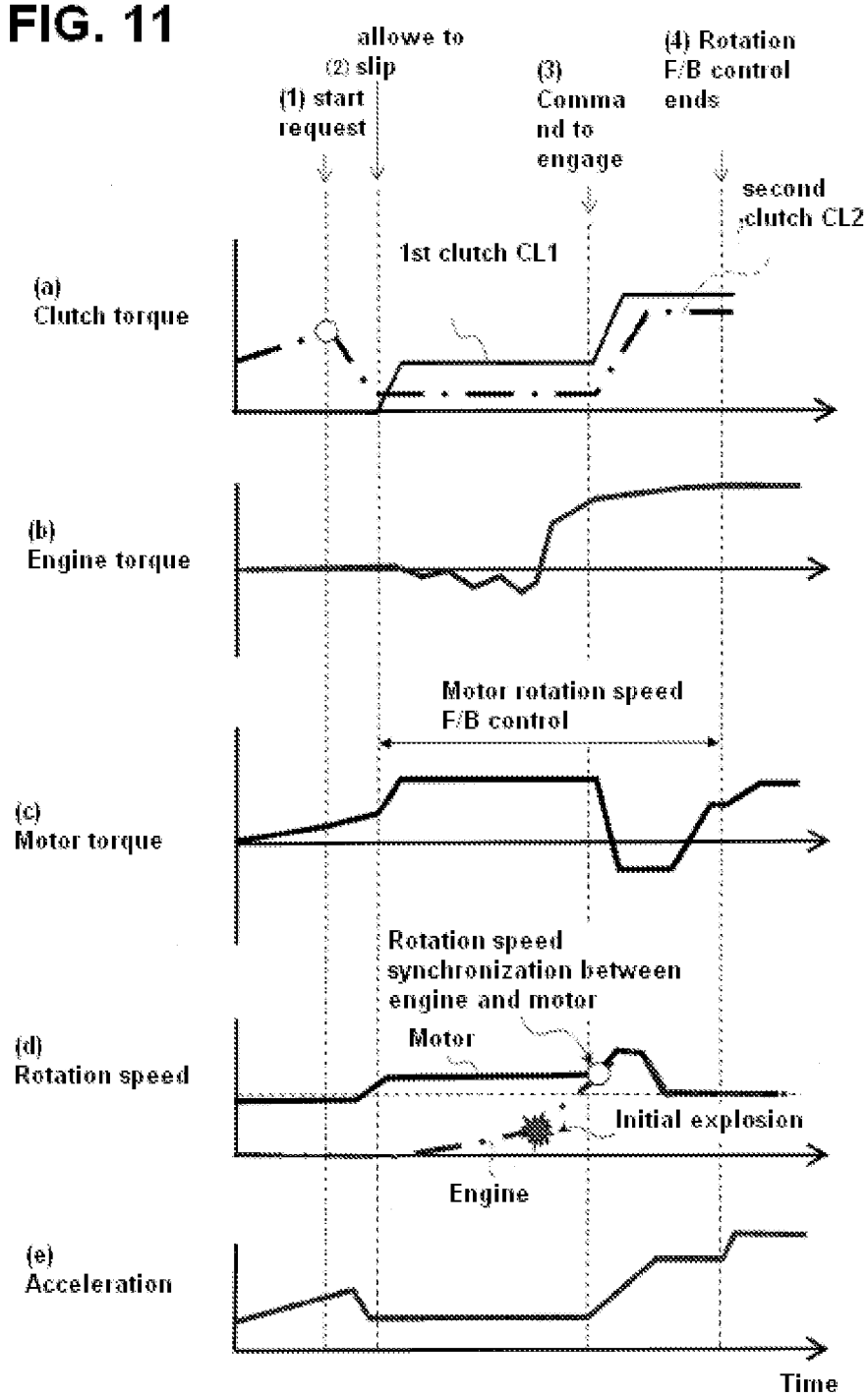
FIG. 11 is a timing chart showing a normal start control in the embodiment according to the present invention.
Figure 12:
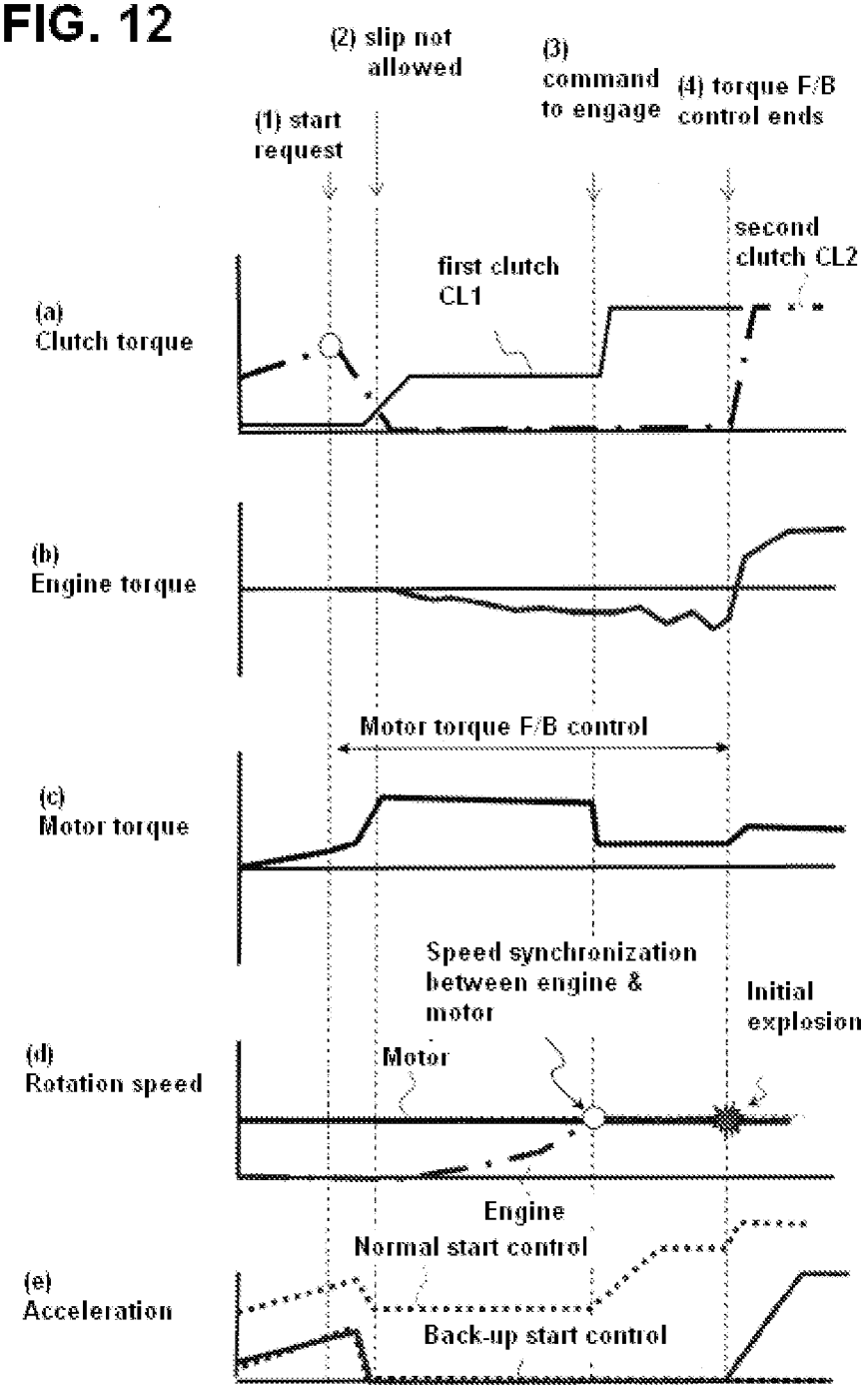
FIG. 12 is a timing chart showing a backup start control in the embodiment according to the present invention.

FIG. 11 is a timing chart showing a normal start control in the embodiment according to the present invention and FIG. 12 is a timing chart showing a back-up start control in the embodiment according to the present invention First, when mode selection section 200 selects HEV drive mode as target mode during operation of EV drive mode, a mode switching command to HEV mode including the engine start request is transmitted from mode selection section 200 to operation point command section 400 (Step S10, FIG. 10).

The slip determination section 410 in the operation point command section 400 determines whether or not second clutch is allowed to slip upon receipt of this engine start request (Step S20).

More specifically, slip determination section 410 sends a command to hydraulic unit 26, which would reduce the target second clutch transmission torque capacity tTc2 of second clutch 25 to zero. In addition, slip determination section 410 sends a command which increases the target motor/generator torque tTm by a predetermined amount to motor control unit 80 so that the second clutch may easily generates a rotation difference. In this state, slip determination section 410 calculates a rotation difference of second clutch 25 (=Nm−Ni) based on the motor rotation speed Nm and transmission input rotation speed Ni.

Here, when the rotation difference of second clutch 25 exceeds the predetermined rotation Ns (i.e., Nm−Ni>Ns), the slip determination section 410 determines that the second clutch 25 is allowed to slip. On the other hand, when the rotation difference of second clutch 25 is equal to or less than the predetermined rotation speed Ns (i.e., Nm−Ni≤Ns), then the slip determination section 410 determines that second clutch 25 may not slip.

Note that, despite the command to reduce the target second clutch transmission torque capacity tTc2 to zero as well as the command to increase the target motor/generator torque tTm by a predetermined amount being issued, the occurrence that the rotation difference across the second clutch 25 is below the predetermined rotation speed Ns is attributable to the second clutch 25 being stuck. The stuck state of the second clutch 25 denotes such a situation in which the engagement of second clutch 25 cannot be released due to failure or adhesion despite the command to release engagement.

When second clutch 25 is determined to be allowed to slip in step S20 (YES at step S20), start determination section 420 allows engine 10 to start and start control section 430 starts the engine 10 in accordance with a normal start control in step S30.

FIG. 11 is a timing chart showing the flow of normal start control executed in this step S30.

As shown in FIG. 11, in this normal start control process, under the presence of start request of engine 10 from mode selection section 200 (step S10, see FIG. 11 (1)), when the second clutch 25 is determined to be allowed to slip in step S20 (see FIG. 11 (2)), the rotation speed of engine 10 will be increased by causing the first clutch 15 to slip while maintaining the second clutch 25 to slip (see FIG. 11 (*a*) and (*b*)).

When the rotation speed of engine 10 has increased to some extent, command to inject fuel and ignite to spark to initially combust engine 10 (see FIG. 11(*d*)).

Subsequently, when the rotation speed of engine 10 and that of motor/generator 20 is brought into synchronization (see FIG. 11 (3)), the first clutch 15 and second clutch 26 will be engaged sequentially.

Note that, in this normal start control, since engine 10 may be started while holding the second clutch 25 in a slipping state, motor/generator is controlled by a feedback control on rotation speed (see FIG. 11(*c*)).

In step S20 in FIG. 10, when the second clutch 25 is determined not to be allowed to slip (No in step S20), start determination section 420 compares vehicle speed VSP with the predetermined vehicle speed VSP1 in step S40. In this step S40, by comparing vehicle speed VSP with the predetermined vehicle speed VSP1, a determination is made whether or not the operation point is positioned in the region of WSC drive mode in FIG. 8.

At the vehicle speed VSP being less than the predetermined vehicle speed VSP1 (VSP<VSP1, i.e., No at step S40), then up until a predetermined time has elapsed after a command to hydraulic unit 26 to reduce the target second clutch transmission torque capacity tTc2 of second clutch 25 to zero and a command to increase the target motor/generator torque tTm by a predetermined amount to motor control unit 80 are issued, slip determination section 410 continues to determine whether or not the second clutch 25 is allowed to slip (NO at step S50, No at step S60).

In the present embodiment, in steps S50 and S60, by continuing to determine for slip admissibility for a predetermined period of time, the reliability to determine the inadmissibility (inhibition) of engine start is enhanced. Note that, at No decision in step S40, control may omit steps S50 and S60 and directly advance to step S70.

In case where the slip determination section 410 does not determine the second clutch 25 allowable to slip within a predetermined time (YES in step S50), start determination section 420 does not allow engine 10 to start and returns to EV drive mode (step S70).

Note that, when start determination section 420 does not allow engine 10 to start, and the engine start request from mode selection section 200 continues, then the step S20 and subsequent steps in FIG. 10 will be repeated.

On the other hand, when slip determination section 420 determines the second clutch 25 allowable to slip with the predetermined time (No in step S50, YES in step S60), start determination section 420 allows engine 10 to start and start control section 430 starts the engine 10 in accordance with the normal start control described above (step S30).

In step S40, when the vehicle speed VSP is equal to or greater than the predetermined vehicle speed VSP1 (VSP≥VSP1, YES in step S40), start determination section 420 allows engine 10 to start and start control section 430 starts engine 10 in accordance with the back-up start control in step S80.

FIG. 12 is a timing chart showing the back-up start control process executed in this step S80.

As shown in FIG. 12, in the back-up start control, under presence of engine start request from mode selection section 200 (step S10, see FIG. 12, (1)), when the second clutch 25 is determined not to be allowed to slip (see FIG. 12 (2)), rotation speed of engine 10 will be increased by holding the first clutch in a slipped state while maintaining the second clutch 25 engaged (see FIG. 12(*a*) and (*d*)).

Subsequently, when the rotation speed of engine 10 is synchronized with the rotation speed of motor/generator (see FIG. 12 (3)), the first clutch 15 is engaged completely (see FIG. 12(*a*)), and after several rotations of engine upon engagement of first clutch 15, engine 10 is injected with fuel and ignited by spark to achieve an initial explosion (see FIG. 12 (4)). In response to second clutch 25 being started, second clutch 25 will be engaged (see FIG. 12(*a*)).

Note that, by performing an initial explosion after a few rotations of engine 10 upon engagement of first clutch 15, the residual air remaining in cylinder of engine 10 may be discharged and a torque associated with engine starting operation may be reduced.

During this back-up start control process, since engine 10 is started with second clutch 25 being engaged, motor/generator 20 is feedback controlled on torque in order to reduce the torque generating at engine startup (see FIG. 11(*c*))

Even during the back-up start control process by this start control section 430, slip determination section 410 determines whether or not the second clutch 25 may slip based on the rotation difference across the second clutch 25 (step S90).

In step S90, when the second clutch 25 is determined to be allowed to slip (YES at step S90) by slip determination section 410, start control section 430 switches from the back-up start control to the normal start control by transitioning the second clutch 25 from engaged state to a slipped state. Thus, a discomfort to the drive at engine startup may be alleviated.

As described above, in the present embodiment, in a situation in which engine start request is present and second clutch 25 is not allowed to slip, when vehicle speed VSP is less than the predetermined vehicle speed VSP1 (i.e., within the region of the WSC drive mode), start of engine 10 will be cancelled and engine 10 will not be started in the WSC region. Thus, along with the alleviation of discomfort conveyed to the driver, occurrence of engine stall may be avoided as well.

For example, when engine 10 is started with the second clutch being in a slipped state, as shown by a solid line in FIG. 11(*e*) and dotted line in FIG. 12(*e*), acceleration increases gradually. By contrast, when engine 10 is started without allowing second clutch 25 being in a slopped state, as shown in solid line in FIG. 12(*e*), since the acceleration will increase abruptly due to engagement of second clutch 25, the driver might feel discomfort, especially conspicuously in the region of the WSC drive mode.

On the other hand, even at presence of engine start request in a situation in which the second clutch 25 is not allowed to slip, when the vehicle speed VSP is higher than the predetermined vehicle speed VSP1 (i.e. outside of WSC drive mode region), engine 10 will be started with the second clutch being in an engaged state to prioritize the transition to HEV drive mode. Thus, drive force may be assured and the request for charging battery 30 will be able to be satisfied.

Further, in the present embodiment, when the vehicle speed VSP is less than the predetermined vehicle speed VSP1 in step S40, the admissibility of second clutch 25 to slip is continued until a predetermined time will elapse, reduction in SOC of battery 30 due to the continuation of EV drive mode will be greatly suppressed.

In the present embodiment, after the determination not to allow to start engine 10 in step S70, when the engine start request is continued from mode selection section 200, by repeating execution of step S20 and subsequent steps, admissibility of engine starting will be confirmed again. Therefore, reduction in SOC of battery 30 due to the continuation of EV drive mode will be greatly suppressed.

Further, in the midst of execution of the back-up start control, when the second clutch 25 is allowed to slip, since control changes from the back-up start control to normal start control, the discomfort conveyed to the driver may be reduced.

It should be noted that the second clutch 25 corresponds to an example of the friction engagement element according to the present invention. The automatic transmission 40 in the present embodiment corresponds to an example of transmission according to the present invention. The mode selection section 200 in the present embodiment corresponds to an example of start request unit according to the present invention. The slip determination section 410 corresponds to a slip determination unit according to the present invention. The start determination section 420 corresponds to a start determination unit according to the present invention. Finally, the start control section 430 corresponds to an example of start control unit according to the present invention.

The embodiments described above are descried for ease of understanding of the present invention, and not described to delimit the scope of the present invention. Therefore, respective elements disclosed in the embodiments are illustrated to intend to cover any design modifications or equivalents thereof which belong to the technical scope of the present invention.

The invention claimed is:

1. A control system for controlling a hybrid vehicle including an internal combustion engine and a motor/generator as power sources, a friction engagement element interposed between the power sources and drive wheels, the transmission interposed between the power sources and drive wheels, and a rotation speed detection unit to detect either input rotation speed or output rotation speed of the transmission, comprising:
   a start request unit to request a start of the internal combustion engine;
   a slip determination unit to determine whether or not the friction engagement element is allowed to slip;
   a start determination unit to determine whether or not to allow the internal combustion engine to start, wherein
   the start determination unit that, responsive to receipt of the start request of the internal combustion engine from the start request unit:
      issues a command to reduce torque capacity of the friction engagement element;
      prevents the internal combustion engine from starting when the slip determination unit determines that the friction engagement element is not allowed to slip, and within a predetermined time after the command issues while a rotation speed of the transmission is below a predetermined value;
      allows the internal combustion engine to start by permitting a start control unit to execute a normal start control process to start the internal combustion engine with the friction engagement element in a slipped state when the slip determination unit determines that the friction engagement element is allowed to slip within the predetermined time after the command issues while the rotation speed of the transmission is below the predetermined value;
      allows the internal combustion engine to start by permitting the start control unit to execute a back-up start control process to start the internal combustion engine with the friction engagement element engaged when the slip determination unit determines that the friction engagement element is not allowed to slip responsive to the command and the rotation speed of the transmission is at or above the predetermined value; and
      permits, during the back-up start control process, the start control unit to switch to the normal start control process to start the internal combustion engine while maintaining the friction engagement element in the slipped state when the slip determination unit determines that the friction engagement element is allowed to slip.

2. The control system of a hybrid vehicle claimed in claim 1, wherein
   the predetermined value corresponds to a rotation speed at which the internal combustion engine may rotate autonomously.

3. The control system of a hybrid vehicle claimed in claim 1, wherein
   the start determination unit allows the internal combustion engine to start when the rotation speed of the transmission is equal to or higher than the predetermined value; while
   preventing the start of the internal combustion engine when the rotation speed of the transmission is below the predetermined value, and, for a predetermined period of time after a change in drive force of the motor/generator and output of the command to the friction engagement element to reduce the target torque capacity, the slip determination unit determines whether or not the friction engagement element is allowed to slip.

4. The control system of a hybrid vehicle claimed in claim 1, wherein
   the start determination unit performs a renewed determination whether or not to allow the internal combustion engine to start based on the rotation speed of the transmission, after having not allowed to start the internal combustion engine, when the start request is continuing from the start request unit, and the slip determination unit determines that the friction engagement element not be allowed to slip.

5. A control method for controlling a hybrid vehicle including an internal combustion engine and a motor/generator as power sources, a friction engagement element interposed between the power sources and drive wheels, a transmission interposed between the power sources and drive wheels, and a rotation speed detection unit to detect either input rotation speed or output rotation speed of the transmission, the method comprising:
   responsive to receipt of a start request of the internal combustion engine, issuing a command to reduce torque capacity of the friction engagement element;
   when a rotation speed of the transmission is below a predetermined value, preventing the internal combustion engine from starting when the friction engagement element is not allowed to slip for a predetermined time after the command issues;
   when the rotation speed of the transmission is below the predetermined value and it is determined that the friction engagement element is allowed to slip within the predetermined time after the command issues, starting the internal combustion engine by executing a normal start control process to start the internal combustion engine with the friction engagement element in a slipped state; and when a rotation speed of the transmission is at or above the predetermined value, starting the internal combustion engine by:
  executing a back-up start control process to start the internal combustion engine with the friction engagement element engaged; and
  switching to the normal start control process to start the internal combustion engine while maintaining the friction engagement element in the slipped state, if, during the back-up start control process, it is determined that the friction engagement element is allowed to slip.

* * * * *